(12) United States Patent
Tobita et al.

(10) Patent No.: US 8,343,611 B2
(45) Date of Patent: Jan. 1, 2013

(54) ONE WAY VISION FILM FOR INK JET PRINTING, PRINTING FILM, AND METHOD FOR PRODUCING THEM

(75) Inventors: Joji Tobita, Kawaguchi (JP); Masaki Koide, Kawaguchi (JP)

(73) Assignee: Sanryu Co., Ltd., Saitama (JP)

( * ) Notice: Subject to any disclaimer, the term of this patent is extended or adjusted under 35 U.S.C. 154(b) by 621 days.

(21) Appl. No.: 12/520,908

(22) PCT Filed: Dec. 20, 2007

(86) PCT No.: PCT/JP2007/075232
§ 371 (c)(1),
(2), (4) Date: Jul. 22, 2009

(87) PCT Pub. No.: WO2008/078825
PCT Pub. Date: Jul. 3, 2008

(65) Prior Publication Data
US 2010/0034995 A1 Feb. 11, 2010

(30) Foreign Application Priority Data
Dec. 25, 2006 (JP) .................................. 2006-357433

(51) Int. Cl.
*B32B 3/24* (2006.01)
(52) U.S. Cl. ......... 428/138; 428/137; 156/252; 156/253
(58) Field of Classification Search .................. 428/137, 428/138; 156/252, 253
See application file for complete search history.

(56) References Cited

U.S. PATENT DOCUMENTS
5,858,155 A 1/1999 Hill et al.
2002/0110659 A1* 8/2002 Woods .......................... 428/40.1
2002/0155952 A1 10/2002 Furukawa
2004/0058100 A1* 3/2004 Murasawa et al. ........... 428/32.1

FOREIGN PATENT DOCUMENTS
| JP | 2001-334800 | 4/2001 |
|----|-------------|--------|
| JP | 2001-171054 | 6/2001 |
| JP | 2002-061076 | 2/2002 |
| JP | 2002-067591 | 3/2002 |
| JP | 2005-014371 | 1/2005 |
| JP | 2005-055845 | 3/2005 |
| Wo | 99/65708 | 12/1999 |

OTHER PUBLICATIONS
International Search Report—PCT/JP2007/075232—Feb. 5, 2008.

* cited by examiner

*Primary Examiner* — William P Watkins, III
(74) *Attorney, Agent, or Firm* — Young & Thompson

(57) ABSTRACT

A one-way vision film includes a white film base material; a shrinkable color tone layer on one side of the base material; and a self-adsorptive foamed layer on the base material opposite to the shrinkable color tone layer. The one-way vision film is perforated with through-holes. The self-adsorptive foamed layer has an adhesive function attachable to a surface onto which the film is attached and is printable. Since the printing ink is deposited to the bottoms of the open pores while not closing the openings of the open pores, open pores exposed to the surface of the foamed layer function like suction cups adhering onto a smooth surface. Accordingly, there is no need for forming ink-receptive and pressure-sensitive layers, unlike a conventional film, so the film can have a low cost, three-layer structure. The one-way vision and printed film is easily attachable onto a smooth and transparent substrate like glass.

12 Claims, 8 Drawing Sheets

ONE WAY VISION FILM FOR INK JET PRINTING, PRINTING FILM, AND METHOD FOR PRODUCING THEM

FIELD OF THE INVENTION

The present invention relates to a one-way vision film and the like attached onto a smooth and transparent substrate such as a window glass. Particularly, it relates to a one-way vision film of a type which is attached onto a window glass from the inside. More particularly, it relates to a printed film easily attached to a window glass and the like.

BACKGROUND OF THE INVENTION

A one-way film has a film of a white base material on one side of which a layer of light-shielding color, such as black, is attached. The base material is perforated with lots of through-holes over the whole area thereof. When the film is attached on a window glass of a room or car, the side opposite to the light-shielding colored layer can be seen from the side of the light-shielding colored layer through the window glass; however it is difficult to see the side opposite to the white base material from the side of the white base material. In some of such one-way vision film, an image is printed on the white base material in order to provide a decorative effect.

The one-way vision film has two types, one of which is attached onto the inside of a window glass (inside attachable type) and the other of which is attached onto the outside of a window glass (outside attachable type). In order to attach the film onto a window glass after printing an image, it is necessary to form an adhesive layer on either the printed surface or the surface opposite to the printed surface.

In the outside attachable type film, the adhesive layer is formed onto the surface opposite to the printed surface. Since the film of the type is directly exposed to sun or wind and water or suffers mechanical irritation easily, a pressure-sensitive adhesion is used as an adhesion means in view of durability. So, the one-way vision film of the outside attachable type has a four-layer structure comprising a white base material; a print ink receptive layer formed onto the one side of the white base material; a light-shielding colored layer formed on the other side of the white base material; and a pressure-sensitive adhesive layer formed onto a surface of the light-shielding colored layer. And, at distribution, a backing liner is formed to protect the pressure-sensitive adhesive layer.

Furthermore, in order to obtain a required light stability, it is necessary to subject the film to a laminating for blocking an ultraviolet ray after printing an image onto the ink receptive layer. And, since the through-holes are exposed to an outside environment, dust is easily deposited on the through-holes and therefore the film become dirty in a short period of time and also is difficult to be cleaned. From this point, the laminating is required. Furthermore, when the film of the outside attachable type is applied to a tall building and the like, it is required to set up scaffolding, resulting in requirement of time-consuming works. And, when the film is seen from the outside, a problem is caused that a transparency inherent in a glass is hardly given. From these reasons, the film of the outside attachable type is not recommended.

On the contrary, the film of the inside attachable type is a film in which the adhesive layer is formed onto a side of the printed layer. Some of the film of the type has a four-layer structure comprising a white porous base material; a light-shielding colored layer formed onto one side of the base material; an ink receptive layer formed onto the other side of the base material; and a both-side pressure-sensitive adhesive film which is formed by a laminating after printing an image onto the ink receptive layer. This type requires a laminating equipment for forming the adhesive film. In addition, since an adhesive of the adhesive film penetrates through the through-holes to be exposed to an interior of the room, a dust problem in which dust is easily attached occurs.

Alternatively some of the film of the inside attachable type has a four-layer structure comprising a transparent porous base material on one side of which a pressure-sensitive adhesive layer is formed; an ink receptive layer formed onto the other side of the base material; a white layer which is formed after printing a reflected image onto the ink receptive layer; and a light-shielding colored layer formed onto the white layer. This type requires an after processing for forming the light-shielding colored layer onto the white layer. In addition, this type further requires equipments such as a screen printer for laminating the white layer and the light-shielding colored layer and the like.

As a film of the inside attachable type, a four-layer one-way vision film using a transparent resin film into which a sublimation dye can be diffused is disclosed for example, Japanese patent application 2001-334800, in which a white layer and a light-shielding colored layer are laminated onto one side of the transparent resin film in the order and an adhesive layer is formed onto the other side. By laying a transfer paper, onto which an image is printed by using an ink containing a sublimation dye, on the light-shielding colored layer and then heating the both with contacting each other closely, the sublimation dye permeates the light-shielding colored layer and the white layer so as to dye the transparent resin film The dyed transparent resin film can be seen from the side of the adhesive layer, allowing attaching the film from the inside.

In order to form the image, the producing method of the disclosed film requires a printing process for printing the image onto the transfer paper previously and a transfer process for thermal-transferring the image onto the transparent resin film. In addition, a thermal-transferring apparatus and a sublimation transferring equipment are required, causing problems in economical efficiency and marketability.

Furthermore, another method is disclosed for example, Japanese patent application 2005-14371, in which a printing sheet made of soft polyvinyl chloride is backed with a carrier sheet and then three layers of a color image layer of cyan, magenta, yellow and black; a white layer; and a black layer are thermal-transferring printed onto the other side of the printing sheet by using a thermal transfer ink ribbon. In this method, if a part of the printing sheet is made to be transparent and an adhesive layer is formed onto the carrier sheet, the method, can be applied to form a one-way vision film of the inside attachable type. And, this method does not require a perforating process, causing less working process.

This method requires a ribbon thermal transferring printer which is higher in cost than an ink-jet printer The ribbon thermal transferring printer has problems of low resolution and unable to widen the printing width. In addition, a running cost of image printing is comparatively high in cost than an ink-jet printer. And, an overprinting process is required in order to give sufficient light-shielding performance to the white layer and the light-shielding colored layer. This leads to a problem of rising cost.

Furthermore, according to result of the search carried out by the prior-art search institution recommended by Japanese Patent Office, a one-way graphic product of the inside attachable type is listed as comparison (referring to Published Japanese translations of PCT international publication 2002-518217). The published graphic product comprises a transparent porous film layer provided with a porous adhesive layer on the surface; and a non-porous colorant transferable film layer containing a detachable carrier film provided with at least one of a colored layer on the surface The graphic product has six to seven layers containing a liner, a carrier film and the like, causing increasing of processing steps.

DISCLOSURE OF INVENTION

An object of the present invention is to provide a one-way vision film and a printed film easily attachable onto a smooth and transparent substrate such as a window glass from the inside. Specifically, it is to provide a one-way vision film and. an printed film of an inside attachable type, which is produced with low manufacturing cost and printing cost by using a conventionally used ink jet printer A one-way vision film according to the present invention comprises: a white film as a base material; a shrinkable color tone layer formed onto one side of said base material; and a self-adsorptive foamed layer formed onto said. base material opposite to said shrinkable color tone layer, wherein the one-way vision film is perforated over the whole area thereof and a surface of said self-adsorptive foamed layer functions as an adhesive surface and also a surface to be printed.

In the one-way vision film of the present invention, the self-adsorptive foamed layer has an adhesive function attachable to a surface onto which the film is attached and also is able to be printed with an image. The printing ink is deposited to the bottoms of the open pores while not closing the openings of the open pores. So, a numbers of open pores exposed to the surface of the foamed layer function like a sucking disk to be adsorbed onto a smooth surface. And, since the ink deposited onto the bottoms of the open pores is protected from mechanical stimulation from the outside such as scratching, it has an advantage that the image hardly deteriorates. Accordingly, there is no need for forming the ink receptive (carrier) layer and the pressure-sensitive layer, unlike with a conventionally film, so that the film can have a three-layer structure, causing low manufacturing cost.

The self-adsorptive foamed layer is not attached to a feed roller of a printer because of its relatively less adhesion force than the pressure-sensitive layer, allowing a smooth paper feeding. And, the self-adsorptive foamed layer can be temporarily attached and detached and does not leave an adhesive after detaching.

The shrinkable color tone means color which absorbs light, such as black, and includes color having low brightness of three primary mixed colors and cold color such as cyan, in addition to black.

In the present invention, said self-adsorptive foamed layer is preferably a foamed layer of acrylic resin, polyurethane resin or acrylic and polyurethane mixed resin.

These resins have well adhesion with a printing ink so that a clear image can be printed. Silicone resin may be used as the self-adsorptive foamed layer, in addition to these resins; however the silicon resin has less adhesion force with a printing ink and thus has difficulty in printing a clear image.

Furthermore in the present invention, an image may be printed onto said self-adsorptive foamed layer of the one-way vision film according to claims 1 or 2 with a solvent pigmented ink, a solvent disperse dye ink or a water pigment binder ink.

These inks are not repelled on the self-adsorptive foamed layer, unlike with a water dye ink and a water pigmented ink, and allow printing of a clear image without blur. Use of the water pigment binder ink allows printing of a clear image without blur by printing on heating.

A one-way vision film according another embodiment of the present invention comprises: a white or light-colored base film; a shrinkable color tone layer formed onto a back surface of said base film; and a self-adsorptive foamed layer formed onto a front surface of said base film; wherein the one-way vision film is perforated over the whole area thereof.

The light-color is color which reflects light, such as white, and includes color having low chrome saturation and high brightness, such as gray, in addition to white.

The one-way vision film of the present invention may comprises a printed image layer formed onto a front surface of said self-adsorptive foamed layer with openings of the open pores not being closed.

A one-way vision film according still another embodiment of the present invention comprises: a three-layer film which comprises: a white or light-colored base film; a shrinkable color tone layer formed onto a back surface of said base film; and a self-adsorptive foamed layer formed onto a front surface of said base film, onto the front surface of the layer an image is to be printed; wherein said three-layer film is perforated over the whole area thereof; and a backing liner formed onto a surface of said shrinkable color tone layer of said three-layer film.

A printed film according to the present invention comprises: a base film; a self-adsorptive foamed layer formed onto a front surface of said base film; and a printed image layer formed, onto a front surface of said self-adsorptive foamed layer with openings of the open pores not being closed.

In the above invention, the self-adsorptive foamed layer is preferably a foamed. layer of acrylic resin, polyurethane resin or acrylic and polyurethane mixed resin.

Furthermore, a color material used for printing the image onto said self-adsorptive foamed layer is preferably a solvent pigmented ink, a solvent disperse dye ink or a water pigment binder ink.

A producing method of a one-way vision film according to the present invention comprises steps of: a step for forming a shrinkable color tone layer onto a back surface of a white or light-colored base film; a step for forming a self-adsorptive foamed layer onto a front surface of said base film to produce a three-layer film; a step for perforating the whole area of said three-layer film so as to have a predetermined opening ratio; and a step for printing an image onto a front surface of said self-adsorptive foamed layer of said perforated three-layer film.

A producing method of a one-way vision film according to another embodiment of the present invention comprises steps of: a step for forming a shrinkable color tone layer onto a back surface of a white or light-colored base film; a step for forming a self-adsorptive foamed layer onto a front surface of said base film to produce a three-layer film; a step for perforating the whole area of said three-layer film so as to have a predetermined opening ratio; and a step for attaching a backing liner onto a surface of said shrinkable color tone layer of said perforated three-layer film.

A producing method of a printed film according to the present invention comprises steps of: a step for forming a self-adsorptive foamed layer onto a front surface of a base film; and a step for printing an image onto a front surface of said self-adsorptive foamed layer.

BRIEF DESCRIPTION OF THE DRAWINGS

FIGS. 1 are a view showing a structure of a one-way vision film according to the first embodiment of the present invention.

DETAILED DESCRIPTION OF EMBODIMENT OF THE INVENTION

Hereinafter, preferred embodiments of the present invention will be described in detail with reference to the accompanying drawings.

Figure 1A:
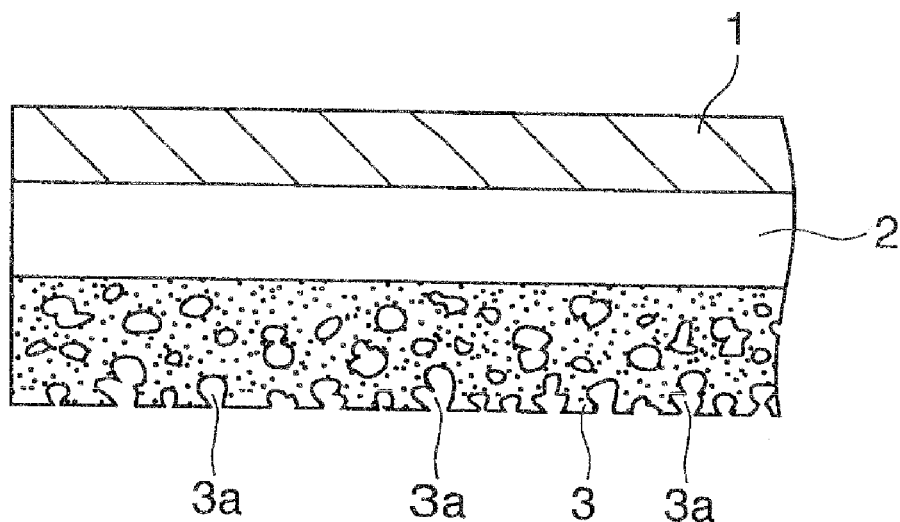
FIG. 1A is a cross sectional view before a perforating process and FIG. 1B is a cross sectional view after a perforating process.
Figure 1B:
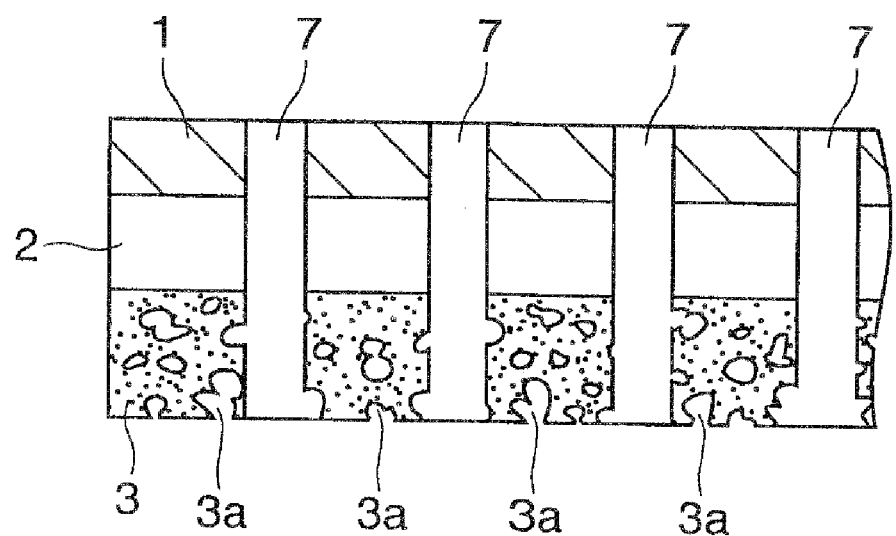

FIGS. 1 are a view showing a structure of a one-way vision film according to the first embodiment of the present invention, FIG. 1A is a cross sectional view before a perforating process and FIG. 1B is a cross sectional view after a perforating process.

Figure 2:
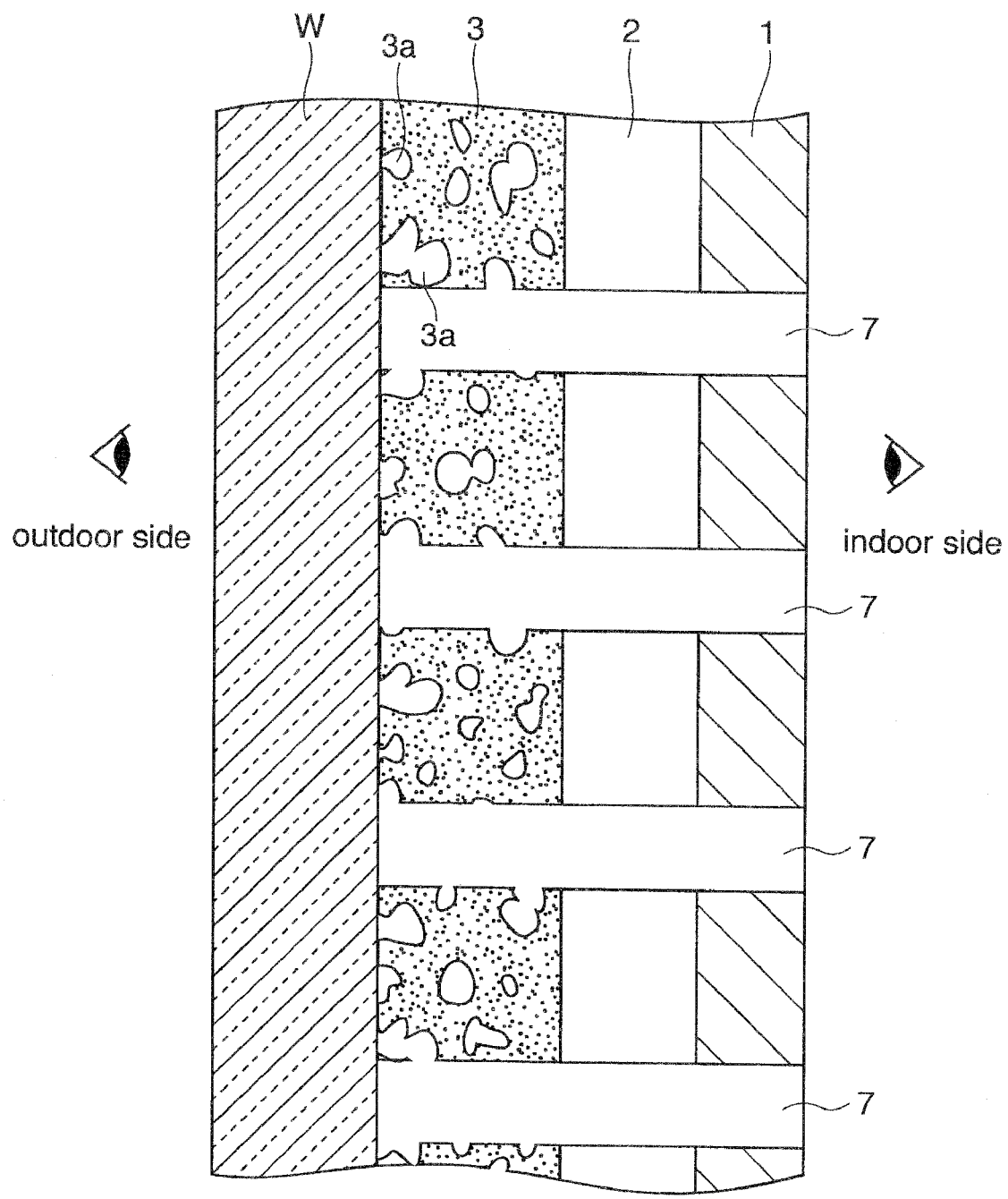
FIG. 2 is a view showing a state in which the one-way vision film of FIG. 1 is attached to a window glass.

FIG. 2 is a view showing a state in which the one-way vision film of FIG. 1 is attached to a window glass.

The one-way vision film has a three-layer structure, as shown in FIG. 1, comprising a base material 2; a shrinkable color tone layer (light-shielding colored layer) 1 formed onto one side of the base material 2; and a self-adsorptive foamed layer 3 formed onto the other side of the base material 2.

As the base material 2, a white or light-colored (for example, bright gray color or bright beige color) film is used. An exemplary film includes a synthetic paper, polyester film, vinyl film, polyolefin film, nonwoven fabric and the like. The base material 2 has a thickness of 20 to 500 µm, preferably 25 to 200 µm, in view of easy handling and flexibility. In order to improve adhesive properties with the self-adsorptive foamed layer 3 and the shrinkable color tone layer 1, the both sides of the base material 2 may be subjected to a surface treatment such as a corona treatment.

As the self-adsorptive foamed layer 3, in view of flexibility, acrylic foaming resin; polyurethane foaming resin; and acrylic and urethane mixed foaming resin may be used. In view of printing suitability and durability, acrylic foaming resin is preferable. As a method for forming the self-adsorptive foamed layer 3 onto one side of the base material 2, well-known methods may be applied (referring to Japanese patent application 2001-171054 and 2002-61076). For example, acrylic resin is applied onto one side of the base material 2 and then foamed to form a foamed layer. Then, the surface of the foamed layer is cut off or scraped away thereby to form the self-adsorptive foamed layer 3 on the surface of which open pores 3a are exposed.

Preferable diameter of the open pores 3a exposed to the surface of the self-adsorptive foamed layer 3 is 0.5 µm to 100 µm, more preferably several µm to 50 mµ, in order to obtain a sufficient adsorption after printing and also to introduce a pigment dyestuff and fix it firmly without blur. Preferable thickness of the self-adsorptive foamed layer 3 is 25 µm to 2000 µm in order to form the foams easily and obtain a sufficient adsorption.

The shrinkable color tone layer (light-shielding colored layer) 1 is for making the image opaque and thus invisible and is formed by applying an ink of shrinkable color such as black, which is light-absorbable color, onto the other side of the base material 2. For example, the shrinkable color tone layer 1 is formed by applying a black ink onto the base material 2 using a well-known method such as a silk screen printing, gravure printing, splay painting and coating. The shrinkable color tone color is deep gray and navy blue, in addition to black. Preferable thickness of the shrinkable color tone layer 1 is 10 µm to 30 µm. Alternatively, the shrinkable color tone layer 1 may be formed by applying a light-shielding film.

The three-layer film (referring to FIG. 1A) is perforated to form plural of though-holes 7. This forms the one-way vision film shown in FIG. 1B. The through-hole 7 has a circular shape of 1.5 mm to 2.0 mm in diameter, for example. Preferable opening ratio of the film is 30% to 70%. The perforating treatment is carried out by a hole puncturing.

A state in which the one-way vision film is attached onto a window glass will be described.

As shown in FIG. 2, this one-way vision film is placed onto the indoor side of the window glass W by attaching the self-adsorptive foamed layer 3 to the glass W. At this time, plural of open pores 3a opened to the surface of the foamed layer 3 function as a sucking disk and are adsorbed to a smooth surface of the window glass W. When the outside of the room is seen from the inside of the room through the window glass W, the outside of the room can be seen through plural of through-holes 7 without preventing visibility. On the contrary, from the outside of the room, the inside of the room is hardly seen through the window glass W.

Figure 3:
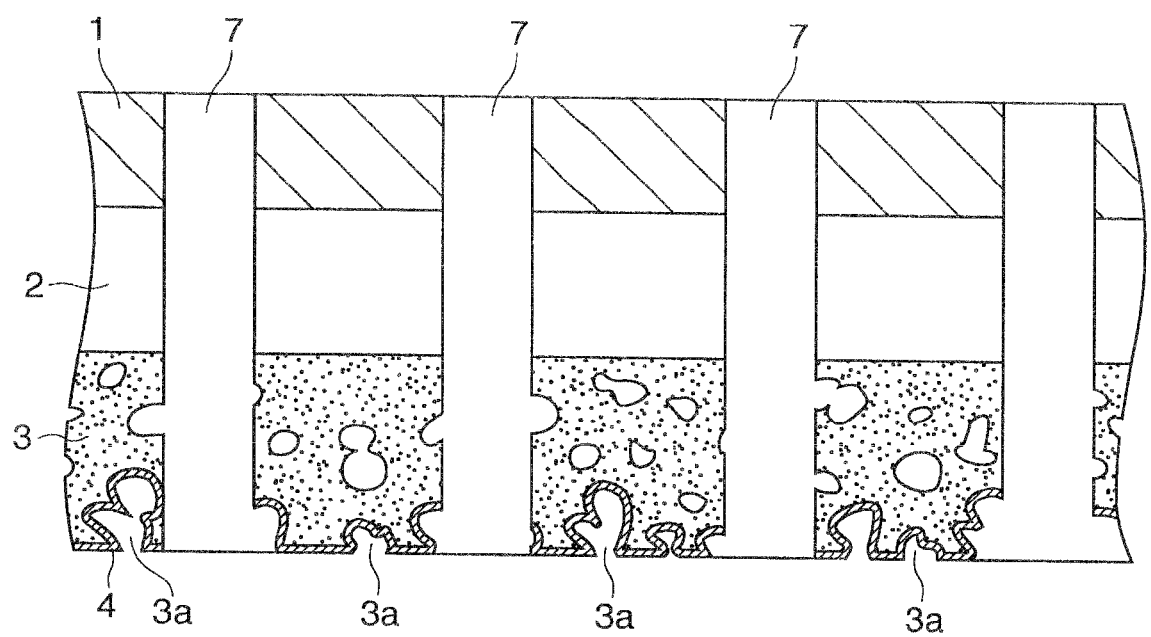
FIG. 3 is a cross sectional view showing a structure of a one-way vision film according to the second embodiment of the present invention.

FIG. 3 is a cross sectional, view showing a structure of a one-way vision film according to the second embodiment of the present invention.

Figure 4:
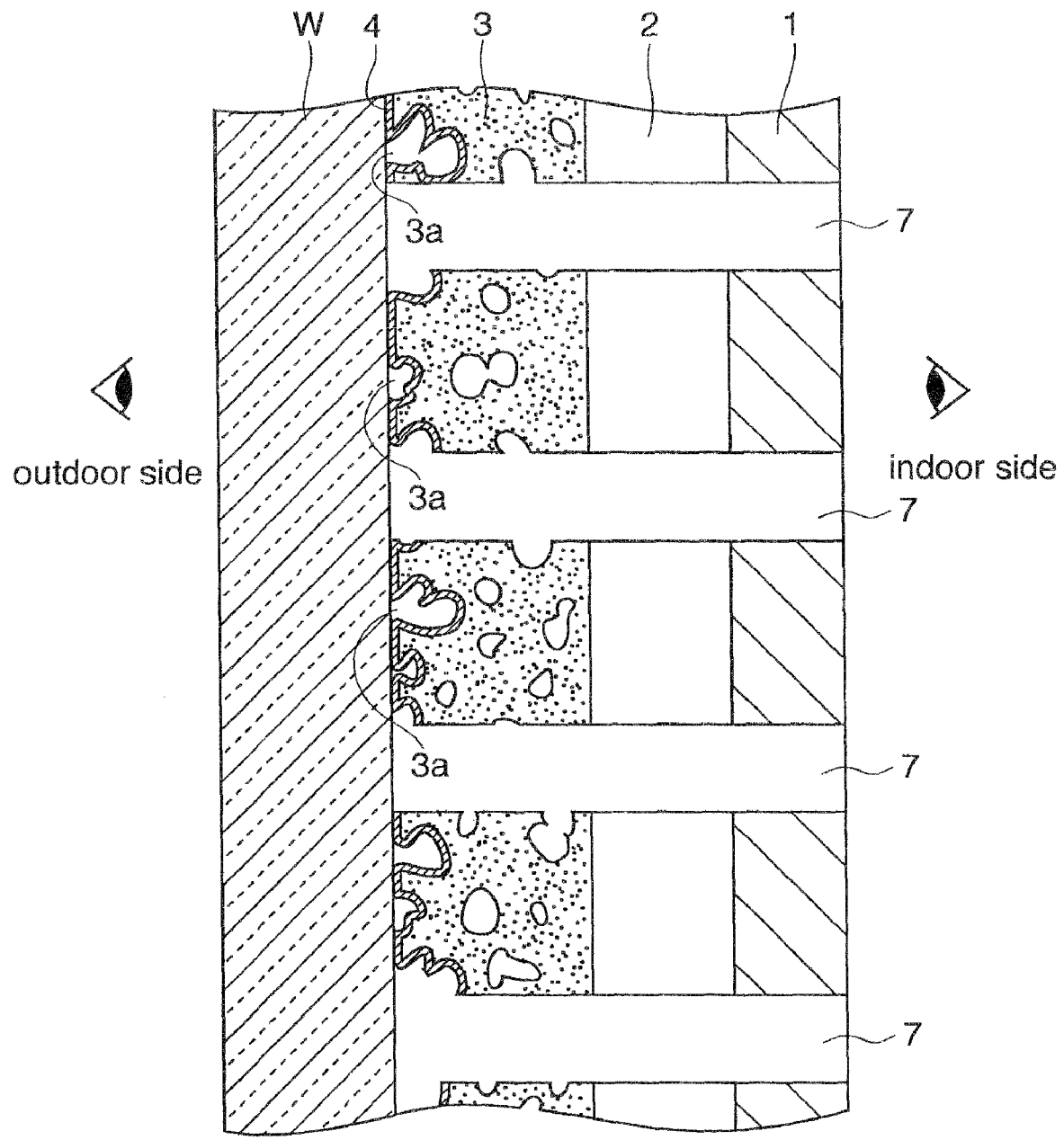
FIG. 4 is a view showing a state in which the one-way vision film of FIG. 3 is attached to a window glass.

FIG. 4 is a view showing a state in which the one-way vision film of FIG. 3 is attached to a window glass.

The one-way vision film has a three-layer structure, as with FIG. 1, comprising a base material 2; a shrinkable color tone layer (light-shielding colored layer) 1 formed onto one side of the base material 2; and a self-adsorptive foamed layer 3 formed onto the other side of the base material 2. The whole area of the film is perforated with through-holes 7. In this embodiment, an image 4 is printed onto the surface of the self-adsorptive foamed layer 3.

The image 4 is printed by an ink jet printer using a solvent pigment ink or solvent disperse dye ink. When a water pigment binder ink containing a resin is used, the printing is carried out on heating.

As shown in FIG. 4, this one-way vision film is also placed onto the indoor side of the window glass W by plural of the open pores 3a exposed to the surface of the self-adsorptive foamed layer 3 functioning as a sucking disk. At this time, particles of the ink constituting the image do not fill the openings of the pores but is deposited onto the inner surfaces of the open pores 3a so that the sucking disk function is not prevented. In this embodiment, when the outside of the room is seen through the window glass W from the inside of the room, the outside of the room can be seen through plural of through-holes 7. On the contrary, the image 4 is seen from the outside of the room through the window glass W.

The producing process of the one-way vision film will be described.

Figure 5:
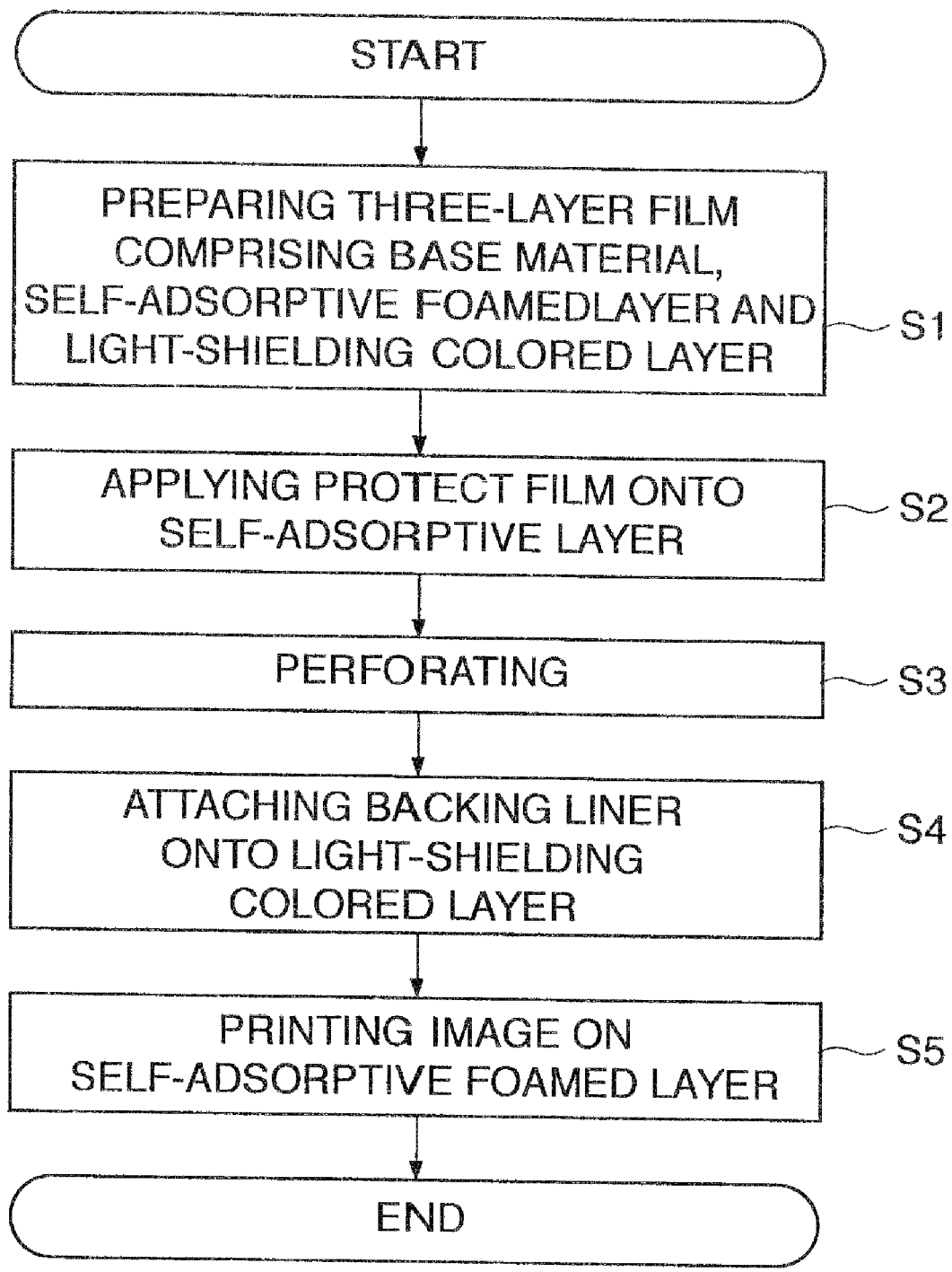
FIG. 5 is a view showing a manufacturing process of the one-way vision film of FIG. 3.

FIG. 5 is a view showing a manufacturing process of the one-way vision film of FIG. 3.

Figure 6:
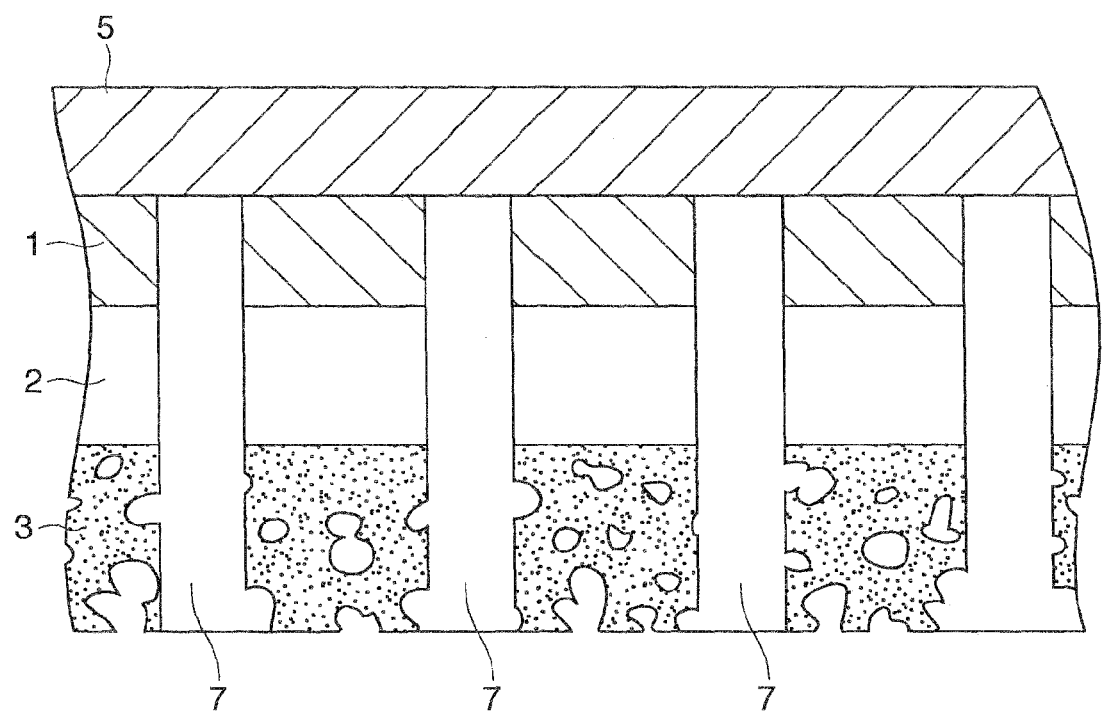
FIG. 6 is a cross sectional view showing a structure of the film at one process of the manufacturing process.

FIG. 6 is a cross sectional view showing a structure of the film at one process of the manufacturing process.

At step 1, the three-layer film comprising the base material 2; the self-adsorptive foamed layer 3; and the shrinkable color tone layer 1 is prepared, as described above. At step 2, a protect film is attached onto a surface of the self-adsorptive foamed layer 3. As the protect film, a polyethylene film and the like are used. At step 3, the four-layer film containing the protect film is perforated by a hole puncturing to have a predetermined opening ratio and thus to form through-holes 7

Alternatively, at step 1, a commercially available three-layer adsorptive film comprising the base material 2, the self-adsorptive foamed layer 3 and the protect film may be used. In this case, the shrinkable color tone layer 1 is applied onto the adsorptive film.

At step 4, a backing liner 5 is attached onto the surface of the shrinkable color tone layer 1 (referring to FIG. 6.) The backing liner 5 is for preventing falling of an ink onto a frame and the like of the printer at printing. The backing liner 5 has a low adhesive layer on a surface to which the shrinkable color tone layer 1 is attached. When a textile printer for printing an image onto a cloth directly is used, which is equipped with gutters for accepting an excessive ink so as to prevent contaminating the back side of the cloth, the backing liner is unnecessary.

When the film is stored temporarily or shipped, a five-layer film containing the backing liner 5 may be rolled into a roll. In this case, the protect film may remain or be detached. In the case for detaching the protect film, since the self-adsorptive foamed layer 3 comes in contact with the surface opposite to the low adhesive layer of the backing liner 5, the low adhesive layer is selected such that an adhesive force with the shrinkable color tone layer 1 is larger than an adhesive force with the self-adsorptive foamed layer 3.

At step 5, an image is printed onto the self-adsorptive foamed layer 3 by an ink jet printer using a solvent pigmented ink or a solvent disperse dye ink. The self-adsorptive foamed layer 3 does not adhere onto a feed roller of the printer because of its adhesion force lower than a pressure-sensitive adhesive layer, allowing a smooth paper feeding. When a water pigment binder ink containing resin is used, an image can be printed by printing on heating.

This one-way vision film thus produced is attached onto the indoor side of the window glass with the self-adsorptive foamed layer 3 onto which the image has been printed, after detaching the backing liner 5.

Figure 7:
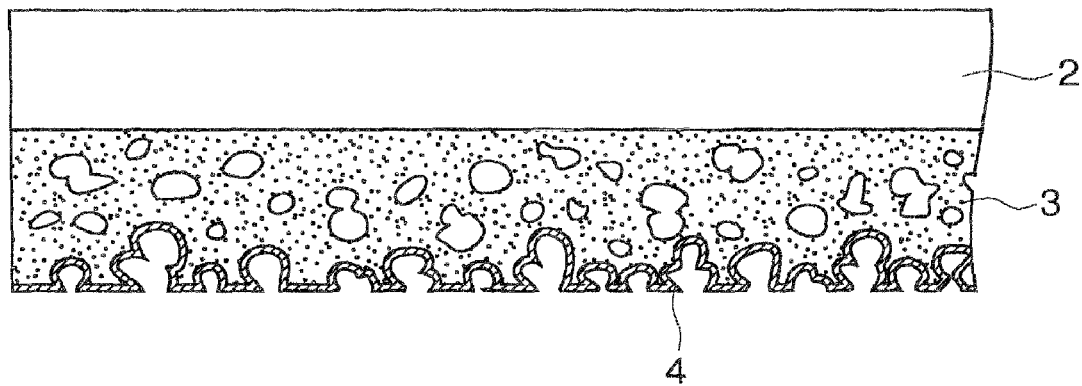
FIG. 7 is a cross sectional view showing a structure of a printed film according to the first embodiment of the present invention.

FIG. 7 is a cross sectional view showing a structure of a printed film according to the first embodiment of the present invention.

The printed film has a two-layer structure comprising a white or light-colored base material 2 and a self-adsorptive foamed layer 3 formed onto one surface of the base material 2, in which an image 4 is printed onto the self-adsorptive foamed layer 3. However, in this embodiment, the whole area of the film is not perforated. That is, the film is not provided with a one-way vision function because of having no through-holes; however the film can be used as a decorative film which is attached onto the indoor side of the window glass.

EXAMPLE 1

A sheet (zeon Al sheet, registered trade name, manufactured by ZEON KASEI Co., Ltd.), made by forming an acrylic resin porous foam (thickness of 100 μm) onto a surface of a white polyester film (thickness of 50 μm), was prepared. An ink for polyester (RAM black, registered trade name, manufactured by Seiko advance Ltd.) was formed onto the polyester film of the sheet by a screen printing and then cured to form a shrinkable color tone layer. The shrinkable color tone layer had a thickness of 25 μm. Then, the film was regularly perforated with circular through-holes 2 mm in diameter over the whole area by a hole puncturing. The opening ratio was set to 40%.

Then, a solid image was printed on the surface of the surface of the porous foam with a solvent pigmented ink (ECOSOL, registered trade name, manufactured by Roland DG Corporation) using an ink jet printer (Roland SP 300, registered trade name, manufactured by Roland DG Corporation). The resolution of the printer was selected to 360 dpi×360 dpi, 360 dpi×720 dpi or 720 dpi×720 dpi and a maximum discharge rate of the ink was selected to 300% or 400%.

Figure 8A:
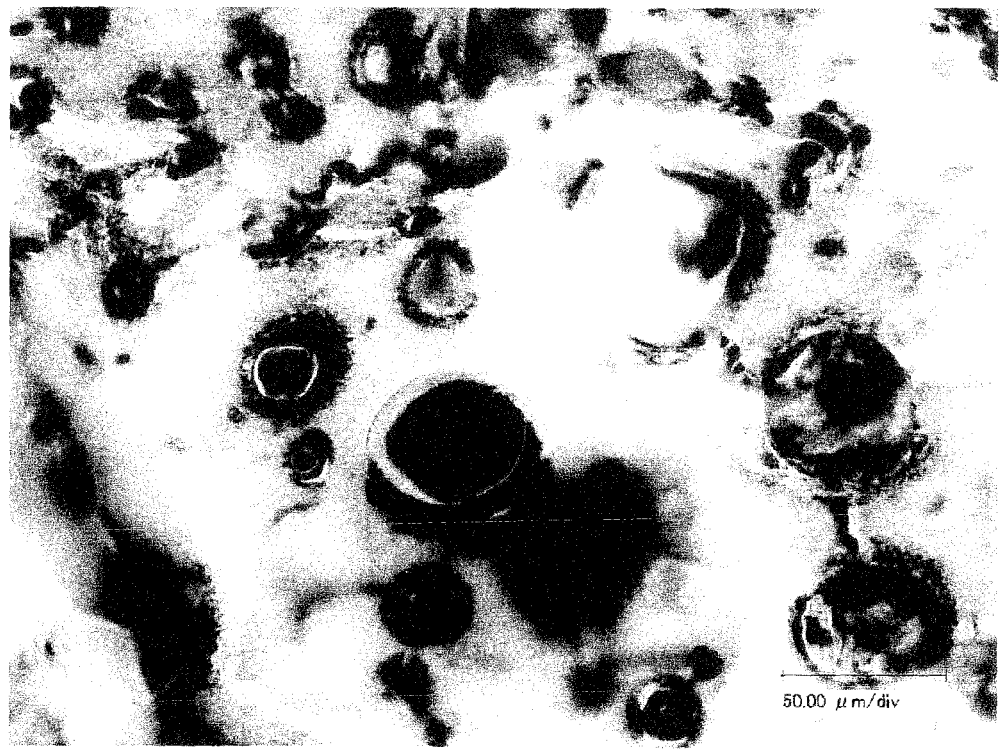
FIGS. 8 are photographs showing a surface of the printed image (a maximum discharge rate of ink is 400%) using a microscope (×1000) with changing the focal depth.
Figure 8B:

FIGS. 8 are photographs showing a surface of the printed image (a maximum discharge rate of ink is 400%) using a microscope (×1000) with changing the focal depth.

These photographs shows that openings of the open pores exposed to the surface of the foam are not closed even after the printing.

The films onto which the image was printed with each resolution and each ink discharge rate was cut into a sample piece 10 cm×10 cm in size. The printed surface of each sample piece was pressed onto the inner surface of the window glass. All of the sample pieces could be attached easily onto the window glass. In a conventionally printed paper, the image is printed with a maximum ink discharge rate of 300%. In this example, a maximum ink discharge rate was set to 400% which was an excessive rate; however it was found that the film could have a sufficient adhesive force even under a condition where it was expected that more pigment particles were attached onto the surface of the foamed layer and thus closed the openings of the open pores.

EXAMPLE 2

A sheet (KUMORANAIHARUPITA, registered trade name, manufactured by RP TOPLA Limited.), made by applying a white adsorptive film having a porous foamed layer of polyurethane resin onto a mirror of polyester resin with a paste, was prepared. An image was printed on the foamed layer of the sheet with a water pigment binder ink (Acrylic binder ink, registered trade name, manufactured by DICOJET) using an ink jet printer. During the printing, the foamed layer was heated to 40° C. to 50° C. The heating proceeded vaporization of water contained in the ink, allowing printing the image onto the foamed layer without blur. As the ink, a solvent pigment ink (ECOSOL, registered trade name, manufactured by Roland DG Ltd.) can be used.

The film can be attached easily onto the inner surface of the window glass.

EXAMPLE 3

A sheet (YUPOSAKUSSIONTAKKU KF340, registered trade name, manufactured by YOPO corporation), made by forming a porous foam (thickness of 210 μm) of acrylic resin onto one surface of a white artificial paper (thickness of 110 μm), was prepared. An ink for a screen printing (PP black, registered trade name, manufactured by Seiko advance Ltd.) was formed onto the artificial paper of the sheet by a screen printing and then cured to form a shrinkable color tone layer. The shrinkable color tone layer had a thickness of 15 μm. Then, the film was regularly perforated with circular through-holes 2 mm in diameter over the whole area by a hole puncturing. The opening ratio was set to 40%.

Then, an image was printed onto the surface of the porous foam with a solvent sublimation ink (SOLVENT DYE SUBINK, registered trade name, manufactured by HILORD) using an ink jet printer. Although the ink was a sublimation ink, the solvent penetrated the acrylic resin, causing good printing. And, a sufficient great color could be obtained without a heat treatment for developing color. The sublimation ink has an inherent problem of causing blur of the image owing to aged deterioration after printing whether the heat treatment for developing color was subjected or the printed image was left without a heat treatment. However, the sharpness of the image can be maintained under a short used period (for example several weeks).

The one-way vision film can be attached easily onto the inner surface of the window glass.

EFFECT OF THE INVENTION

As can be seen from the above-mentioned description, according to the present invention, an image can be printed on the self-adsorptive foamed layer and also the self-adsorptive foamed layer can be attached to a surface onto which the film is attached. So, a one-way vision film of an inside attachable type having a three-layer structure comprising a base material, a self-adsorptive foamed layer and a shrinkable color tone layer can be provided. An image can be printed by an ink jet printer using a solvent ink. In this case, by selecting the self-adsorptive foamed layer and the ink suitably, an ink receptive layer, which has been necessary for a one-way vision film for an ink jet printing, can be omitted so that it becomes possible to produce a one-way vision film with a low manufacturing cost. And, it does not require a screen printer and a heat transferring apparatus.

The self-adsorptive foamed layer can be temporarily attached and detached because of less adhesion force than a pressure-sensitive adhesive. And, an adhesive does not leave on the detached surface.

In a printed film attached to a window glass and the like, as mentioned above, the self-adsorptive foamed layer is used as both an adhesive layer and an ink receptive layer and therefore the printed film has a two-layer structure comprising a base film and a self-adsorptive foamed layer. So, a printed film having a simple structure can be provided.

What is claimed is:
1. A one-way vision film comprising:
   a) a three-layer film which comprises:
      1) a white or light-colored base film;
      2) a light-absorbing color layer formed on a back side of said base film; and
      3) a self-adsorptive foamed layer formed on a front side of said base film, the foamed layer comprising a plurality of open pores on its surface,
      wherein said three-layer film is perforated over the whole area thereof with a plurality of through-holes; and
   b) a backing liner attached onto a surface of said light-absorbing color layer.
2. A method of producing a one-way vision film, comprising:
   forming a light-absorbing color layer on a back surface of a white or light-colored base film;
   forming a self-adsorptive foamed layer on a front surface of said base film to produce a three-layer film, the foamed layer comprising a plurality of open pores on its surface;
   perforating the whole area of said three-layer film with a plurality of through-holes so as to have a predetermined opening ratio; and
   attaching a backing liner onto a surface of said light-absorbing color layer of said perforated three-layer film.
3. The one-way vision film according to claim 1, wherein a protective film is attached on a surface of said self-adsorptive foamed layer.
4. The method according to claim 2, further comprising:
   attaching a protective film on the surface of said self-adsorptive foamed layer.
5. A one-way vision film comprising an image printed onto said self-adsorptive foamed layer of the one-way vision film according to claim 1, wherein the image is printed with a solvent pigmented ink, a solvent disperse dye ink or a water pigment binder ink.
6. A window glass, comprising the one-way vision film according to claim 1 attached to an indoor surface of the window glass, wherein the film is attached by a suction effect of a plurality of open pores exposed to a surface of the self-adsorptive foamed layer.
7. A method of attaching the one-way vision film according to claim 1 to a window glass, comprising attaching the film to an indoor surface of the window glass by a suction effect of the plurality of open pores.
8. The one-way vision film according to claim 1, further comprising a printed image layer formed on the surface of said self-adsorptive foamed layer, wherein the image layer does not completely fill the open pores.
9. The one-way vision film according to claim 1, wherein said self-adsorptive foamed layer comprises acrylic resin, polyurethane resin, or acrylic and polyurethane mixed resin.
10. The one-way vision film according to claim 1, wherein the through-holes have a diameter of 1.5 mm to 2.0 mm.
11. The one-way vision film according to claim 1, wherein the plurality of through-holes provides an opening ratio in the film of 30% to 70%.
12. The one-way vision film according to claim 1, wherein the backing liner does not comprise through-holes.

* * * * *